(12) United States Patent
Lucas et al.

(10) Patent No.: US 11,905,132 B2
(45) Date of Patent: Feb. 20, 2024

(54) CONTAINER BULK MATERIAL DELIVERY SYSTEM

(71) Applicant: Halliburton Energy Services, Inc., Houston, TX (US)

(72) Inventors: Bryan Chapman Lucas, Duncan, OK (US); Tim H. Hunter, Duncan, OK (US); Calvin L. Stegemoeller, Duncan, OK (US); Bryan John Lewis, Duncan, OK (US); Austin Carl Schaffner, Duncan, OK (US); Jim Basuki Surjaatmadja, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 17/375,321

(22) Filed: Jul. 14, 2021

(65) Prior Publication Data
US 2021/0339966 A1 Nov. 4, 2021

Related U.S. Application Data

(62) Division of application No. 15/522,653, filed as application No. PCT/US2015/029750 on May 7, 2015, now Pat. No. 11,192,731.

(51) Int. Cl.
*B65G 65/00* (2006.01)
*B65G 65/40* (2006.01)
(Continued)

(52) U.S. Cl.
CPC .............. *B65G 65/40* (2013.01); *B01F 23/50* (2022.01); *B01F 35/71731* (2022.01)

(58) Field of Classification Search
CPC .................................................. B65G 65/40
See application file for complete search history.

(56) References Cited

U.S. PATENT DOCUMENTS

| 1,029,126 A | 6/1912 | Hoover |
| 1,047,680 A | 12/1912 | Mills et al. |

(Continued)

FOREIGN PATENT DOCUMENTS

| EP | 2937826 A1 | 10/2015 |
| GB | 2066220 A | 7/1981 |

(Continued)

OTHER PUBLICATIONS

International Search Report and Written Opinion issued in related PCT Application No. PCT/US2015/029750 dated Jan. 26, 2016, 13 pages.

(Continued)

*Primary Examiner* — Anshu Bhatia
(74) *Attorney, Agent, or Firm* — Conley Rose, P.C.; Rodney B. Carroll

(57) ABSTRACT

Systems and methods for using one or more pre-filled, portable containers, instead of pneumatic transfer, to move bulk material from a transportation unit to a blender receptacle of a blender are provided. A transportation unit may deliver one or more containers of bulk material to the well site, where the containers may be disposed in an elevated position around the blender receptacle. A gravity feed outlet may extend from one or more containers to route bulk material from the one or more containers directly into the blender receptacle. Since the transportation unit is able to unload the portable containers of bulk material without pneumatic transfer, the stackable containers may enable a cleaner and more efficient bulk material transfer at the site.

20 Claims, 6 Drawing Sheets

(51) Int. Cl.
  *B01F 23/50* (2022.01)
  *B01F 35/71* (2022.01)

(56) References Cited

U.S. PATENT DOCUMENTS

| | | |
|---|---|---|
| 1,051,883 A | 2/1913 | Hains |
| 1,224,656 A | 5/1918 | McCandliss |
| 1,405,707 A | 2/1922 | Beers |
| 1,519,153 A | 12/1924 | Mitton |
| 1,726,603 A | 9/1929 | Allen |
| 1,795,987 A | 3/1931 | Adams |
| 1,798,423 A | 3/1931 | Vogel-Jorgensen |
| 2,138,172 A | 11/1938 | Johnson |
| 2,231,911 A | 2/1941 | Hitt et al. |
| 2,281,497 A | 4/1942 | Hyson et al. |
| 2,385,245 A | 9/1945 | Willoughby |
| 2,415,782 A | 2/1947 | Zademach et al. |
| 2,513,012 A | 6/1950 | Dugas |
| 2,563,470 A | 8/1951 | Kane |
| 2,652,174 A | 9/1953 | Shea et al. |
| 2,670,866 A | 3/1954 | Glesby |
| 2,678,737 A | 5/1954 | Mangrum |
| 2,759,737 A | 8/1956 | Manning |
| 2,802,603 A | 8/1957 | McCray |
| 2,867,336 A | 1/1959 | Soldini et al. |
| 2,873,036 A | 2/1959 | Noble |
| 3,049,248 A | 8/1962 | Heltzel et al. |
| 3,083,879 A | 4/1963 | Coleman |
| 3,151,779 A | 10/1964 | Rensch et al. |
| 3,203,370 A | 8/1965 | Haug et al. |
| 3,217,927 A | 11/1965 | Bale, Jr. et al. |
| 3,318,473 A | 5/1967 | Jones et al. |
| 3,326,572 A | 6/1967 | Murray |
| 3,343,688 A | 9/1967 | Ross |
| 3,354,918 A | 11/1967 | Coleman |
| 3,380,333 A | 4/1968 | Clay et al. |
| 3,404,963 A | 10/1968 | Fritsche et al. |
| 3,410,530 A | 11/1968 | Gilman |
| 3,432,151 A | 3/1969 | O'Loughlin et al. |
| 3,467,408 A | 9/1969 | Regalia |
| 3,476,270 A | 11/1969 | Cox et al. |
| 3,602,400 A | 8/1971 | Cooke |
| 3,627,555 A | 12/1971 | Driscoll |
| 3,698,693 A | 10/1972 | Poncet |
| 3,785,534 A | 1/1974 | Smith |
| 3,802,584 A | 4/1974 | Sackett et al. |
| 3,986,708 A | 10/1976 | Heltzel et al. |
| 4,023,719 A | 5/1977 | Noyon |
| 4,058,239 A | 11/1977 | Van Mill |
| 4,138,163 A | 2/1979 | Calvert et al. |
| 4,178,117 A | 12/1979 | Brugler |
| 4,204,773 A | 5/1980 | Bates |
| 4,248,337 A | 2/1981 | Zimmer |
| 4,258,953 A | 3/1981 | Johnson |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,473,175 A | 9/1984 | Zengaffinen |
| 4,544,279 A | 10/1985 | Rudolph |
| 4,548,507 A | 10/1985 | Mathis et al. |
| 4,583,663 A | 4/1986 | Bonerb |
| 4,626,166 A | 12/1986 | Jolly |
| 4,701,095 A | 10/1987 | Berryman et al. |
| 4,806,065 A | 2/1989 | Holt et al. |
| 4,850,702 A | 7/1989 | Arribau et al. |
| 4,854,714 A | 8/1989 | Davis |
| 4,856,681 A | 8/1989 | Murray |
| 4,900,157 A | 2/1990 | Stegemoeller et al. |
| 4,919,540 A | 4/1990 | Stegemoeller et al. |
| 4,956,821 A | 9/1990 | Fenelon |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin et al. |
| 5,149,192 A | 9/1992 | Hamm et al. |
| 5,303,998 A | 4/1994 | Whitlatch et al. |
| 5,339,996 A | 8/1994 | Dubbert et al. |
| 5,343,813 A | 9/1994 | Septer |
| 5,375,730 A | 12/1994 | Bahr et al. |
| 5,401,129 A | 3/1995 | Eatinger |
| 5,413,154 A | 5/1995 | Hurst, Jr. et al. |
| 5,426,137 A | 6/1995 | Allen |
| 5,441,321 A | 8/1995 | Karpisek |
| 5,443,350 A | 8/1995 | Wilson |
| 5,445,289 A | 8/1995 | Owen |
| 5,590,976 A | 1/1997 | Kilheffer et al. |
| 5,609,417 A | 3/1997 | Otte |
| 5,722,552 A | 3/1998 | Olson |
| 5,772,390 A | 6/1998 | Walker |
| 5,806,441 A | 9/1998 | Chung |
| 5,913,459 A | 6/1999 | Gill et al. |
| 5,915,913 A | 6/1999 | Greenlaw et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | Mcdonald et al. |
| 6,112,946 A | 9/2000 | Bennett et al. |
| 6,126,307 A | 10/2000 | Black et al. |
| 6,193,402 B1 | 2/2001 | Grimland et al. |
| 6,247,594 B1 | 6/2001 | Garton |
| 6,379,086 B1 | 4/2002 | Goth |
| 6,425,627 B1 | 7/2002 | Gee |
| 6,481,883 B1 | 11/2002 | Ellen |
| 6,491,421 B2 | 12/2002 | Rondeau et al. |
| 6,517,232 B1 | 2/2003 | Blue |
| 6,536,939 B1 | 3/2003 | Blue |
| 6,537,015 B2 | 3/2003 | Lim et al. |
| 6,568,567 B2 | 5/2003 | Mckenzie et al. |
| 6,622,849 B1 | 9/2003 | Sperling |
| 6,655,548 B2 | 12/2003 | Mcclure et al. |
| 6,876,904 B2 | 4/2005 | Oberg et al. |
| 6,980,914 B2 | 12/2005 | Bivens et al. |
| 7,008,163 B2 | 3/2006 | Russell |
| 7,086,342 B2 | 8/2006 | O'Neall et al. |
| 7,100,896 B1 | 9/2006 | Cox |
| 7,114,905 B2 | 10/2006 | Dibdin |
| 7,252,309 B2 | 8/2007 | Eng Soon et al. |
| 7,284,579 B2 | 10/2007 | Elgan et al. |
| 7,351,025 B2 | 4/2008 | Galijan |
| 7,451,015 B2 | 11/2008 | Mazur et al. |
| 7,475,796 B2 | 1/2009 | Garton |
| 7,500,817 B2 | 3/2009 | Furrer et al. |
| 7,513,280 B2 | 4/2009 | Brashears et al. |
| 7,665,788 B2 | 2/2010 | Dibdin et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-Pusset et al. |
| 8,573,917 B2 | 11/2013 | Renyer |
| 8,585,341 B1 | 11/2013 | Oren et al. |
| 8,607,289 B2 | 12/2013 | Brown et al. |
| 8,616,370 B2 | 12/2013 | Allegretti et al. |
| 8,622,251 B2 | 1/2014 | Oren |
| 8,662,525 B1 | 3/2014 | Dierks et al. |
| 8,668,430 B2 | 3/2014 | Oren et al. |
| D703,582 S | 4/2014 | Oren |
| 8,827,118 B2 | 9/2014 | Oren |
| 8,834,012 B2 | 9/2014 | Case et al. |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,340,353 B2 | 5/2016 | Oren et al. |

(56) References Cited

U.S. PATENT DOCUMENTS

| | | |
|---|---|---|
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,760,752 B2 | 6/2017 | Negro et al. |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,604,338 B2 | 3/2020 | Allegretti |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2006/0120209 A1 | 6/2006 | Galijan |
| 2007/0014185 A1 | 1/2007 | Diosse et al. |
| 2007/0201305 A1 | 8/2007 | Heilman et al. |
| 2008/0187423 A1 | 8/2008 | Mauchle et al. |
| 2008/0273415 A1 | 11/2008 | Thornton |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0177313 A1 | 7/2009 | Heller et al. |
| 2009/0292572 A1 | 11/2009 | Alden et al. |
| 2009/0314791 A1 | 12/2009 | Hartley et al. |
| 2010/0025041 A1 | 2/2010 | Phillippi et al. |
| 2010/0196129 A1 | 8/2010 | Buckner |
| 2010/0319921 A1 | 12/2010 | Eia et al. |
| 2011/0211418 A1 | 9/2011 | Tassone |
| 2012/0017812 A1 | 1/2012 | Renyer et al. |
| 2012/0018093 A1 | 1/2012 | Zuniga et al. |
| 2012/0037231 A1 | 2/2012 | Janson et al. |
| 2012/0181093 A1 | 7/2012 | Fehr et al. |
| 2012/0219391 A1 | 8/2012 | Teichrob et al. |
| 2013/0128687 A1* | 5/2013 | Adams ............... B01F 27/1152 366/151.1 |
| 2013/0135958 A1 | 5/2013 | O'Callaghan |
| 2013/0142601 A1 | 6/2013 | Mciver et al. |
| 2013/0206415 A1* | 8/2013 | Sheesley ............... B65G 65/00 166/308.1 |
| 2013/0284729 A1 | 10/2013 | Cook et al. |
| 2014/0023463 A1 | 1/2014 | Oren |
| 2014/0044508 A1 | 2/2014 | Luharuka et al. |
| 2014/0076569 A1 | 3/2014 | Pham et al. |
| 2014/0083554 A1 | 3/2014 | Harris |
| 2014/0093319 A1 | 4/2014 | Harris et al. |
| 2014/0216736 A1 | 8/2014 | Leugemors et al. |
| 2014/0299225 A1 | 10/2014 | Oren |
| 2014/0305769 A1 | 10/2014 | Eiden, III et al. |
| 2014/0377042 A1 | 12/2014 | Mcmahon |
| 2015/0003955 A1 | 1/2015 | Oren et al. |
| 2015/0016209 A1 | 1/2015 | Barton et al. |
| 2015/0044004 A1 | 2/2015 | Pham et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0280476 A1 | 9/2016 | Stegemoeller |
| 2016/0332809 A1 | 11/2016 | Harris |
| 2016/0332811 A1 | 11/2016 | Harris |
| 2017/0021318 A1 | 1/2017 | Mciver et al. |
| 2017/0123437 A1 | 5/2017 | Boyd et al. |
| 2017/0129696 A1 | 5/2017 | Oren |
| 2017/0144834 A1 | 5/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0349226 A1 | 12/2017 | Oren et al. |
| 2018/0257814 A1 | 9/2018 | Allegretti et al. |
| 2019/0009231 A1 | 1/2019 | Warren et al. |
| 2019/0111401 A1 | 4/2019 | Lucas et al. |
| 2020/0062448 A1 | 2/2020 | Allegretti et al. |

FOREIGN PATENT DOCUMENTS

| | | |
|---|---|---|
| GB | 2204847 A | 11/1988 |
| JP | 01122831 A | 5/1989 |
| JP | 06182767 A | 7/1994 |
| JP | 2008239019 A | 10/2008 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 1/2014 |
| WO | 2015119799 A1 | 8/2015 |
| WO | 2015191150 A1 | 12/2015 |
| WO | 2015192061 A1 | 12/2015 |

(56) References Cited

FOREIGN PATENT DOCUMENTS

| | | |
|---|---|---|
| WO | 2016044012 A1 | 3/2016 |
| WO | 2016160067 A1 | 10/2016 |

OTHER PUBLICATIONS

U.S. Pat. No. 0,802,254A, Oct. 17, 1905,|Can-Cooking Apparatus,|John Baker et al.
Office Action issued in related Canadian Patent Application No. 2,996,055 dated Oct. 2, 2020, 5 pages.
Search report issued in related Canadian application No. 2,967,291, dated May 30, 2018 (6 pages).
U.S. Pat. No. 0,917,646A, Apr. 6, 1909,|Bottle Stopper,|Newey, George H.
U.S. Pat. No. 0,710,611A, Oct. 7, 1902,|Chute Wagon,|Ray, Alexander.
U.S. Pat. No. 0,722,782A, Mar. 17, 1903,|Apparatus for Making Concrete,|Weaver, Charles.
U.S. Pat. No. 0,829,127A, Aug. 21, 1906,|Mixing Apparatus,|Strauss, Julian B.
U.S. Pat. No. 0,833,790A, Oct. 23, 1906,|Mixing Machine,|Miles, William.
U.S. Pat. No. 0,890,641A, Jun. 16, 1908,|Concrete Mixing Apparatus,|Hains, Peter C., Sr.
U.S. Pat. No. 0,894,749A, Jul. 28, 1908,|Apparatus for Mixing Concrete,|Von Siller, Alfred.
International Preliminary Report on Patentability issued in related PCT Application PCT/US2015/029750, dated Nov. 16, 2017, 10 pages.

\* cited by examiner

CONTAINER BULK MATERIAL DELIVERY SYSTEM

CROSS-REFERENCE TO RELATED APPLICATIONS

The present application is a Divisional Application of U.S. patent application Ser. No. 15/522,653 filed Apr. 27, 2017, which is a U.S. National Stage Application of International Application No. PCT/US2015/029750 filed May 7, 2015, both of which are incorporated herein by reference in their entirety for all purposes.

TECHNICAL FIELD

The present disclosure relates generally to transferring solid or liquid bulk materials for well operations, and more particularly, to a stackable container delivery system for providing bulk materials into a blender.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material through a chute into a blender tub.

The pneumatic conveying process used to deliver bulk material from the tank truck can be a time-consuming process. In addition, some well locations are arranged without a large amount of space to accommodate tank trucks, such that only a limited number of available tank trucks can be positioned to pneumatically fill the storage/delivery system at a given time. Accordingly, the pneumatic conveying process can lead to dead time of equipment usage and relatively high detention costs or demurrage costs associated with the tank trucks, hoses, and related equipment that are on-location during this time.

Furthermore, during the pneumatic conveying process, the bulk material is moved from the tank truck to the storage/delivery system in a turbulent manner, leading to large amounts of dust and noise generation. The air used for conveying the material must be vented from the storage tank and typically carries an undesirable amount of dust with it. Attempts to control dust during the conveying process typically involve the rig up and use of auxiliary equipment, such as a dust collector and duct work, adding cost to the material handling operations.

In addition, traditional material handling systems can have several transfer points between the outlets of multiple storage/delivery systems and a blender. These transfer points often have to be shrouded and ventilated to prevent an undesirable release of dust into the environment. Further, after the dust has been captured using the dust collectors and ventilation systems, additional steps are needed to dispose of the dust.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
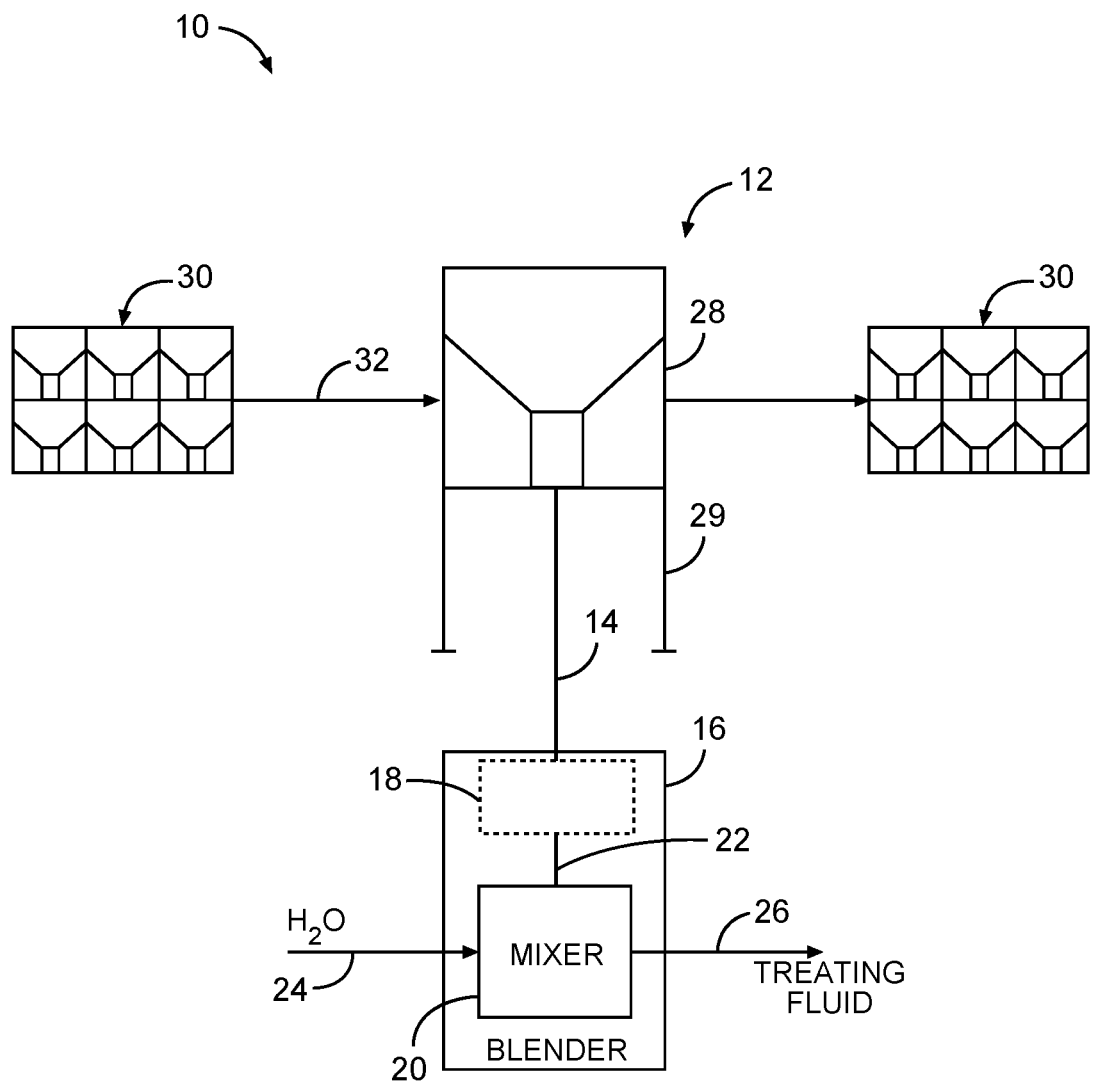
FIG. 1 is a schematic block diagram of a bulk material handling system suitable for mixing bulk additive materials with liquids to form well treating fluids at a well site, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for managing bulk material (e.g., bulk solid or liquid material used on location) efficiently at a well site. More specifically, the disclosed embodiments are directed to systems and methods for efficiently moving bulk material into a blender receptacle associated with a blender on location, which could be into a blender hopper or directly into a mixing tub of the blender. The present disclosure may include a system that utilizes one or more containers (e.g., pre-filled containers or filled on location) holding bulk material and arranged around the blender receptacle to transfer bulk material from the containers directly into the blender receptacle. The disclosed techniques may be used to efficiently handle any desirable bulk material having a solid or liquid constituency including, but not limited to, sand, proppant, gel particulate, dry-gel particulate, liquid additives and others.

In currently existing on-site bulk material handling applications, dry material (e.g., sand, proppant, gel particulate, or dry-gel particulate) may be used during the formation of treatment fluids. In such applications, the bulk material is transferred between transportation units, storage tanks, blenders, and other on-site components. The bulk material is often transferred pneumatically using pressurized air flows to provide the bulk material, for example, from a transportation unit (e.g., tank truck) to a storage/delivery system (e.g., silo). The bulk material may later be moved from the storage/delivery system to a hopper on a blender truck. A sand screw, chute, or other metering mechanism disposed in the hopper then meters the bulk material into a mixing tub of the blender, where the bulk material is mixed with other materials (e.g., water, fluids, chemicals, etc.). In some instances, the bulk material can be transferred pneumatically from a transportation unit into a storage tank on the blender truck.

Pneumatic transfer methods are generally selected due to the simplicity of the process. However, certain inherent inefficiencies are associated with the above-described pneumatic transfer of bulk material at a well site. First, blowing the bulk material pneumatically from a transportation unit to a storage/delivery system is a time consuming process, taking at least an hour to empty a single truck. Although the pneumatic process of blowing bulk material into a storage container can be accomplished prior to using the bulk material in blender operations, the long amount of time spent pneumatically transferring the bulk material to the storage/delivery system can lead to high equipment/detention costs. Detention costs are associated with the transportation equipment (e.g., tank trucks) being positioned on location for a period of time. In some instances, the equipment on location may be arranged so that accessibility to storage/delivery systems is limited for transportation units being used to pneumatically fill the storage/delivery systems. As a result, a large amount of time can be wasted by trucks waiting to move into position as other trucks are unloading bulk material, or trucks waiting for the material already in a storage bin to be used to make room for the next load of material.

In addition, the pneumatic transfer of bulk material tends to require a large amount of air to move the material through the system. As this volume of air vents to the atmosphere, fine dust particles are entrained and released. It is undesirable for this dust to be released into the atmosphere. Accordingly, existing systems employ dust control techniques that often utilize large pieces of additional equipment, separate power supplies, and complicated setups. In addition, the pneumatic transfer process, as well as the systems used to control dust, can lead to an undesirable level of noise produced during bulk material transfer.

The bulk material container systems disclosed herein are designed to address and eliminate these shortcomings. The presently disclosed techniques use a plurality of pre-filled, portable containers, instead of a pneumatic transfer process, to move the bulk material from a transportation unit to the blender receptacle (e.g., blender hopper or mixer). The transportation unit may deliver one or more containers of bulk material to the well site, where the containers may then be arranged on a platform (e.g., stand, rack structure) around the blender receptacle. The one or more containers may include gravity feed outlets extending therefrom, and these outlets may be used to route bulk material from the containers directly into the blender receptacle.

In some embodiments, the containers may be stacked one over another. The stacked containers may be connected such that bulk material may be dispensed directly from one upper container into the next lower container (e.g., via a chute, hatch, opening, etc.), and so forth. A gravity feed outlet may extend from the bottom container in each container stack, to route bulk material from the one or more containers in the stack directly into the blender receptacle. In other embodiments, individual gravity feed outlets may extend from each of the containers in the stack to route bulk material selectively from each of the containers in the stack directly into the blender receptacle. Since the transportation unit is able to unload the stackable containers of bulk material without pneumatic transfer, the stackable containers may be used to more efficiently transfer bulk material to the blender.

The stackable container systems and methods described herein may reduce detention costs associated with bulk material handling at the location, since the efficient filling process may enable a quicker offloading of each tank truck, as compared to those that rely on pneumatic transfer. In addition, by eliminating the pneumatic conveyance process entirely, the stackable container system may reduce the amount of dust generated at the location, as well as the noise levels associated with the bulk material transfer. The reduced dust generation may allow a reduction in the size of various dust control equipment used to ventilate the material handling system, leading to a reduction in overall cost, footprint, and rig-up time of the dust control equipment.

Turning now to the drawings, FIG. 1 is a block diagram of a bulk material handling system 10. The system 10 includes a container stack 12 featuring one or more elevated containers for holding a quantity of bulk material (e.g., solid or liquid treating material). The container stack 12 may utilize a gravity feed to provide a controlled, i.e. metered, flow of bulk material at an outlet 14. The outlet 14 may be a gravity feed outlet that conveys the bulk material from the container stack 12 to a blender 16. As illustrated, the blender 16 may include a hopper 18 and a mixer 20 (e.g., mixing compartment). The blender 16 may also include a metering mechanism 22 for providing a controlled, i.e. metered, flow of bulk material from the hopper 18 to the mixer 20. However, in other embodiments the blender 16 may not include the hopper 18, such that the outlet 14 from the container stack 12 may provide bulk material directly into the mixer 20.

Water and other additives may be supplied to the mixer 20 (e.g., mixing compartment) through an inlet 24. The bulk material and water may be mixed in the mixer 20 to produce (at an outlet 26) a fracing fluid, gel, cement slurry, drilling mud, or any other fluid mixture for use on location. The outlet 26 may be coupled to a pump for conveying the treating fluid into a well (e.g., a hydrocarbon recovery well) for a treating process. It should be noted that the disclosed container stack 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

The container stack 12 may include one container 28 holding bulk material, this container 28 being elevated (e.g., on a platform 29) above a receiving portion of the blender 16 and stackable with at least another container. Although only one container stack 12 is illustrated, other embodiments may include several container stacks 12 (having at least one container 28) disposed near the blender 16. In the illustrated embodiment where the stack 12 features just one container 28, the container 28 may be replaceable such that once the bulk material from the container stack 12 runs low, a new container 28 may be placed on the platform 29 to maintain a steady flow of bulk material to the blender 16. In other embodiments, the container 28 may be integral with the platform 29 so that, when the bulk material from the container stack 12 runs low, a new container 28 featuring an integral platform 29 may be used to replace the empty container 28/platform 29.

A portable bulk storage system 30 may be provided at the well site for storing one or more additional containers 28 of bulk material to be used in the container stack 12. The bulk material containers 28 may be transported to the well site on a transportation unit (e.g., truck). The bulk storage system 30 may be the transportation unit itself or may be a skid, a pallet, or some other holding area. Before a treatment begins, one or more containers 28 of bulk material may be transferred from the storage system 30 to the container stack 12, as indicated by the arrow 32. This transfer may be performed by lifting the container 28 via a hoisting mechanism, such as a forklift or a crane.

After one or more of the containers 28 in the container stack 12 are emptied, the empty upper container(s) 28 may be removed via a hoisting mechanism. In some embodiments, the one or more empty containers 28 may be positioned on another bulk storage system 30 (e.g., a transportation unit, a skid, a pallet, or some other holding area) until they can be removed from the well site and/or refilled. In other embodiments, the one or more empty containers 28 may be positioned directly onto a transportation unit for transporting the empty containers 28 away from the well site. It should be noted that the same transportation unit used to provide one or more filled containers 28 to the well site may then be utilized to remove one or more empty containers from the well site.

Figure 2:
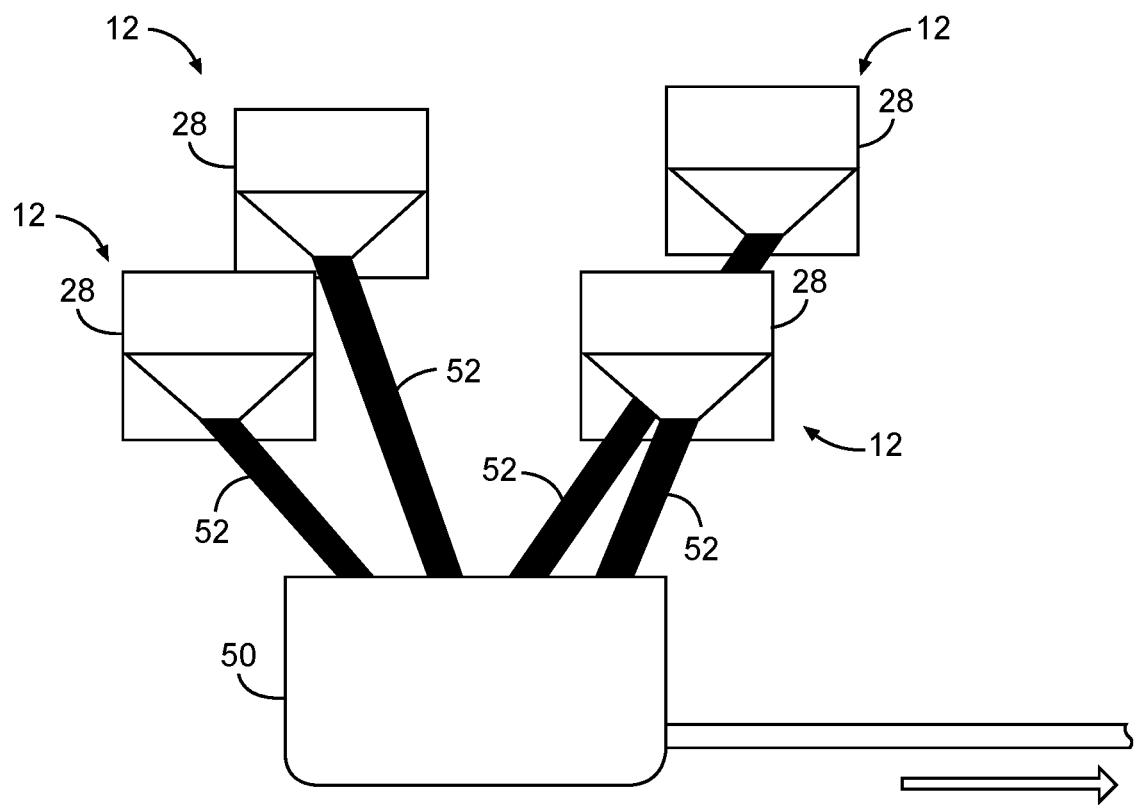
FIG. 2 is a schematic view of containers disposed around a blender receptacle (e.g., blender tub or hopper) for dispensing bulk material into the blender receptacle, in accordance with an embodiment of the present disclosure.

FIG. 2 provides a more detailed view of an embodiment of the containers 28 holding bulk material and disposed in stacks 12 around a blender receptacle 50 (e.g., hopper or mixer) associated with a blender. As illustrated, several container stacks 12 (each including one container 28) may be disposed around the blender receptacle 50 and used to deliver bulk material into the blender receptacle 50. The container stacks 12 may be elevated so that all the containers 28 in the stacks 12 are disposed above the blender receptacle 50. Again, this may be accomplished by placing the containers 28 on a specially designed platform 29. As illustrated, each container stack 12 may include a gravity feed outlet 52 extending from the container 28 of the stack 12, to dispense bulk material from the container stack 12 directly into the blender receptacle 50. The gravity feed outlets 52 may be chutes, as shown, or may be any other desirable type of mechanical outlet that facilitates a flow of bulk material from the above container 28 directly into the blender receptacle 50 under a force due to gravity.

The term "blender receptacle" used herein may refer to any number of tubs, hoppers, mixers, and other areas where bulk material is needed. As mentioned above, the blender receptacle 50 may be associated with a blender disposed at the well site. For example, the blender receptacle 50 may be a blender hopper (e.g., hopper 18 of FIG. 1) used to provide bulk material to a metering system that meters the bulk material into a mixer. In other embodiments, the blender receptacle 50 may be a mixing tub (e.g., mixer 20 of FIG. 1) of a blender. In such instances, the blender receptacle 50 (mixer) may be configured such that it is sitting directly on the ground, instead of in an elevated position within the blender. This may enable the container stacks 12 to dump bulk material directly into the mixer, without the containers 28 being elevated exceedingly high. In still other embodiments, the blender receptacle 50 may be a mixer feeder (e.g., conveyor, sand screw, or the metering mechanism 22 of FIG. 1). Other embodiments of the system 10 may utilize other types of blender receptacle 50 for receiving the bulk material from the disclosed container stacks 12.

As illustrated, each of the container stacks 12 may include just a single container 28. Single container stacks 12 may be utilized when a relatively small amount of bulk material is needed for a particular well treatment. In addition, single container stacks 12 may be utilized when height restrictions prevent a hoisting mechanism (e.g., forklift) from positioning additional containers 28 onto the stacks 12. When single container stacks 12 such as these are used, additional stacks 12 may be positioned around the receiving bin 50 to provide a desired quantity of bulk material to the receiving bin 50.

Figure 3:
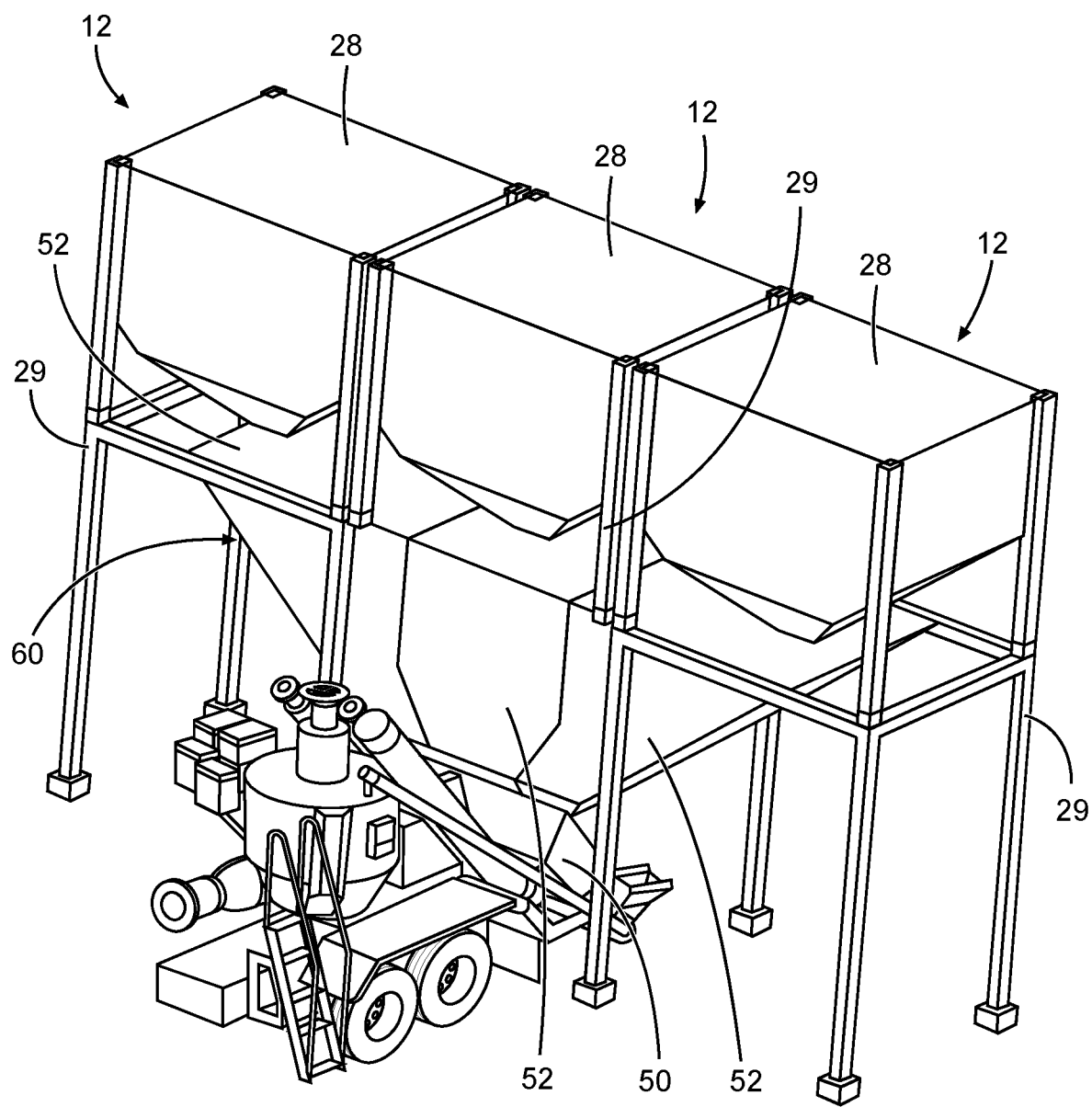
FIG. 3 is a perspective view of containers disposed around a blender receptacle (e.g., blender tub or hopper) for dispensing bulk material through a holding tank into the blender receptacle, in accordance with an embodiment of the present disclosure.

As mentioned above, in some embodiments the gravity feed outlets 52 for the containers 28 may be chutes for routing bulk material directly from a lower end of the container 28 to the top of the blender receptacle 50. However, other types of the gravity feed outlets 52 may be used in other embodiments. For example, FIG. 3 illustrates three containers 28 disposed on platforms 29 in an elevated position around the blender receptacle 50. In some embodiments, the containers 28 may each be coupled to and integrally formed with the respective platforms 29. The containers 28 are disposed over a holding tank 60, or hopper, used to route bulk material directly from the containers 28 into the blender receptacle 50. The holding tank 60 may include a gate at the outlet of the holding tank 60, allowing the holding tank to be emptied into the blender receptacle 50 as desired.

In some embodiments, the holding tank 60 may be sectioned off so that each section of the holding tank 60 functions as a gravity feed outlet 52 for bulk material flowing from a respective container 28 disposed above the particular section. In other embodiments, the holding tank 60 may itself function as a single gravity feed outlet for all of the containers 28 disposed above the holding tank 60.

Figure 4:
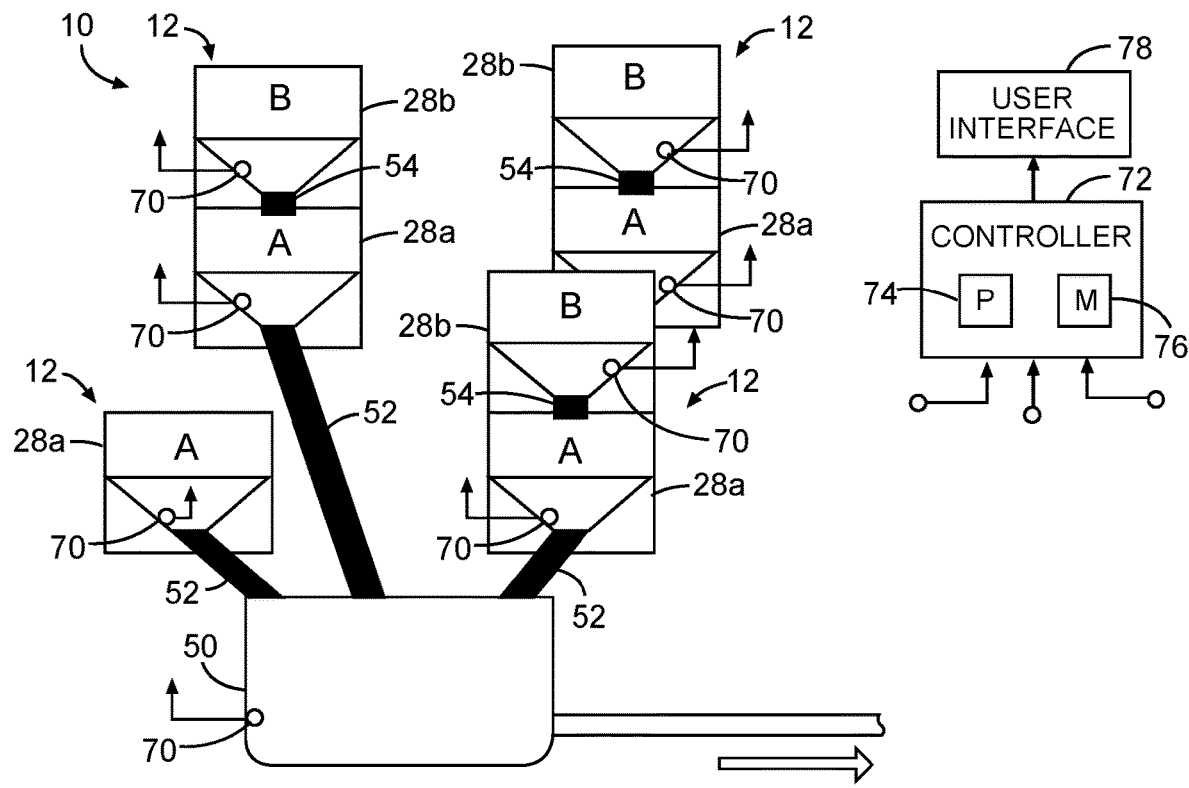
FIG. 4 is a schematic view of containers disposed around a blender receptacle (e.g., blender tub or hopper) for dispensing bulk material into the blender receptacle, in accordance with an embodiment of the present disclosure.

Another embodiment of the container stacks 12 that may be used to provide bulk material directly into the receiving bin 50 is illustrated in FIG. 4. In FIG. 4, some of the container stacks 12 may include two or more containers holding bulk material, and these containers 28 may be positioned in a stacked arrangement over one another. The entire stack 12 may still be elevated over the blender 16. Each of the containers 28 in a given stack 12 may be replaceable such that once the bulk material from the container stack 12 runs low, a new container 28 may be placed on the stack 12 to maintain a steady flow of bulk material to the blender 16. In some embodiments, the lower container 28a in one or more of the stacks 12 may remain generally stationary while the upper container 28b is selectively removable from the lower container 28. This allows the upper container 28b to be selectively removed and replaced to maintain the desired flow of bulk material throughout the system 10. However, it should be noted that the lower container 28a may also be selectively removed and replaced if the lower container 28a has been completely emptied.

In addition, one or more of the container stacks 12 disposed around the blender receptacle 50 may include just a single stackable container 28. The single container 28 may be used in a stack 12, for example, when less than one container full of a certain bulk material is needed for a particular well treatment, while more than one of the container full of another bulk material is needed from the other stacks 12. As illustrated, the single container 28 may be positioned proximate the receiving bin 50 with its gravity feed outlet 52 extending into the receiving bin 50. The other stacks 12 may each include an outlet 52 extending from the lowest container 28a of the stack 12, to dispense bulk material from the container stacks 12 directly into the blender receptacle 50. As discussed in detail below, other embodiments of the container stack 12 may include gravity feed outlets extending from both the upper and lower containers 28 directly to the blender receptacle 50.

Each container 28 in the container stack 12 may hold the same type, particle size, and/or material of bulk material in some embodiments. In other embodiments, the containers 28 in the stack 12 may hold different types, particle sizes, and/or materials of bulk material. Similarly, different stacks 12 disposed around the blender 16 may hold different types, particle sizes, and/or material of bulk material. These different bulk materials may be used to provide a desired treating fluid for the treating process being performed. For example, when performing fracturing operations, it may be desirable to initially pump a treating fluid having smaller proppant particles downhole, to start opening perforations formed within the well. After this, the fracturing treatment may proceed to pumping a treating fluid with large proppant particles downhole, to expand the openings in the perforations. In some embodiments, the large proppant particles may be supplied from one stack 12 after the smaller proppant is used from another stack 12. In other embodiments, the large proppant may be supplied from one container 28 (e.g., upper container 28b) within a stack 12 after the smaller proppant particles are used from the other container 28 (e.g., lower container 28a) in the stack 12.

Figure 5:
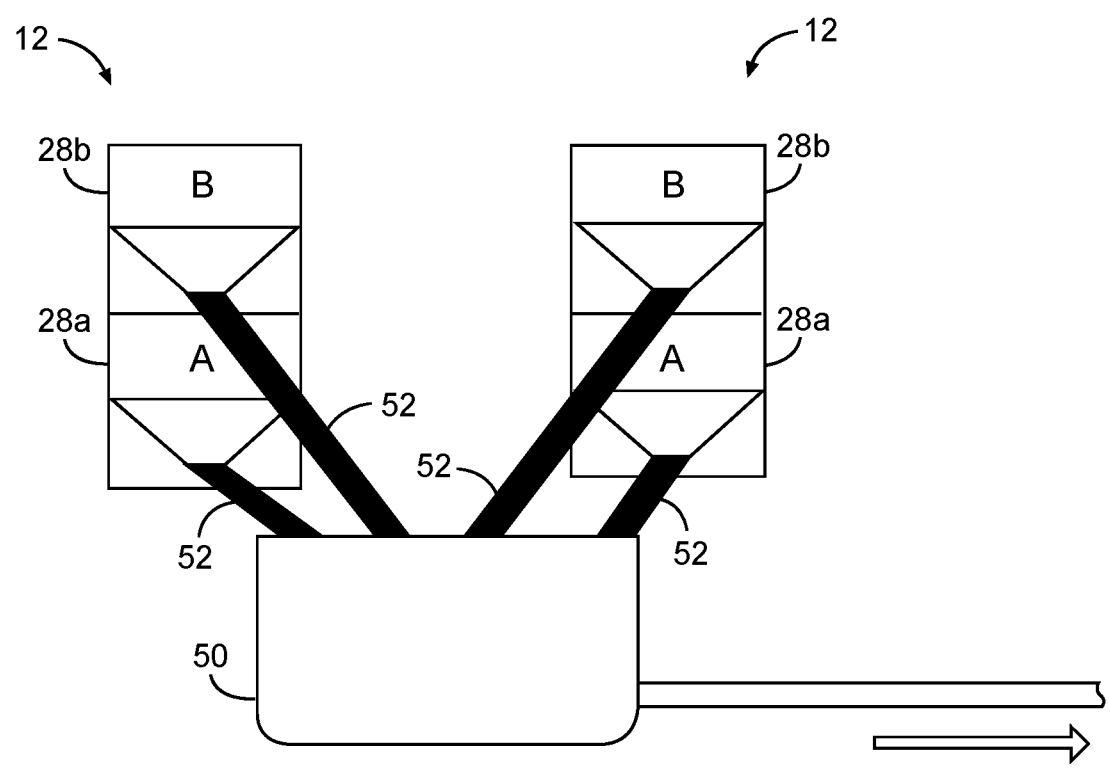
FIG. 5 is a schematic view of containers disposed around a blender receptacle (e.g., blender tub or hopper) for dispensing bulk material into the blender receptacle, in accordance with an embodiment of the present disclosure.

FIG. 5 illustrates another embodiment of the container stacks 12 that may be used to provide bulk material directly into the blender receptacle 50. As shown in FIG. 5, the container stacks 12 may each feature two containers 28 stacked one over another. Each of the containers 28 (including the upper containers 28b) in the container stacks 12 may include a gravity feed outlet 52 extending from the container 28, to dispense bulk material from the container 28 directly into the blender receptacle 50. This arrangement may provide additional flexibility for unloading bulk material from the container stack 12, by enabling the upper containers 28b to release bulk material directly into the blender receptacle 50 without first emptying the lower containers 28a. This may allow the container stacks 12 to provide even more efficient switching between types of bulk material supplied to the blender receptacle 50.

As illustrated and described above with reference to FIGS. 2-5, the stacks 12 of containers 28 may be stationed around the blender receptacle 50. In some embodiments, each container 28 when filled to maximum capacity may hold approximately one tank truck worth of bulk material. To accommodate this amount of bulk material capacity, each of the containers 28 may have an internal volume of up to approximately 14 cubic meters for holding bulk material. In other embodiments, however, the containers 28 used in the container stacks 12 may hold a smaller or larger amount of bulk material than a tank truck. Some containers 28 that are smaller may be more easily stackable using a hoisting mechanism, such as a forklift. Other containers 28 may be larger or elevated to a height where they may be stacked using a more heavy-duty hoisting mechanism, such as a crane.

In FIGS. 2-5, each of the container stacks 12 disposed around the blender receptacle 50 may provide a gravity feed of bulk material into the blender receptacle 50. That is, the bulk material is moved from the containers 28 into the blender receptacle 50 via gravity, instead of on a conveyor. This may keep the bulk material from generating a large amount of dust, since the bulk material is flowing into the blender receptacle 50 instead of falling into the receptacle (which would cause air entrainment of the dust) as more capacity within the blender receptacle 50 becomes available.

The containers 28, both individually and within their stacks 12, may utilize a choke-feed mode to meter the bulk material into the blender receptacle 50. In FIGS. 2 and 5, all the containers 28 (and/or gravity feed outlets extending therefrom) in the container stacks 12 may be shaped to provide a choke feed for the bulk material output from the container 28 into the blender receptacle 50. Once a pile of bulk material is established in the blender receptacle 50, this pile may regulate the amount of bulk material that can be directed into the blender receptacle 50.

In the two-container stacks of FIG. 4, the upper container 28b (and/or a gravity feed outlet extending therefrom) may be shaped to provide a choke feed for the bulk material output from the upper container into the lower container 28a. Similarly, the lower container 28a (and/or the outlet 52 extending therefrom) may be shaped to provide a choke feed for the bulk material output from the lower container to the blender receptacle 50. Once a pile of bulk material is established within the lower container 28a and/or the blender receptacle 50, this pile may regulate the amount of bulk material that can be directed into the container 28 and/or blender receptacle 50.

A more detailed description of the choke feed established by one or more of the containers 28 in the stacks 12 of FIGS. 2-5 will now be provided. It should be noted that any number of intermediate containers may be stacked between the upper and lower container 28 in the stack 12, and these intermediate containers may be arranged to provide a choke feed as well.

In general, the gravity feed outlet 52 may extend from one or more of the containers 28 in a given stack 12 to the blender receptacle 50 such that additional bulk material is discharged from the outlet 52 at a fill level of the bulk material already present in the blender receptacle 50. When an outlet valve or dumping mechanism on the container 28 is actuated, the top of the outlet 52 may be opened and kept open while the outlet 52 fills the blender receptacle 50. The bulk material may travel down the outlet 52 and be discharged into the blender receptacle 50 under a force due to gravity working on the bulk material. In embodiments where solid bulk material is used, an angle of repose of the bulk material in the blender receptacle 50 may affect the flow rate of material from the outlet 52.

In some embodiments (e.g., FIG. 4), another gravity feed outlet 54 may extend from the upper container 28b to the lower container 28a such that additional bulk material is discharged from the outlet 54 at a fill level of the bulk material already present in the lower container 28a. When an outlet valve or dumping mechanism on the upper container 28b is actuated, the top of the outlet 54 may be opened and kept open while the outlet 54 fills the lower container 28a. The bulk material may travel down the outlet 54 and be discharged into the lower container 28a under a force due to gravity working on the bulk material. In embodiments where solid bulk material is used, an angle of repose of the bulk material in the lower container 28 may affect the flow rate of material from the outlet 54.

In some embodiments, the lower containers 28a may hold a first type, particle size, or material of bulk material (A), while the upper containers 28b may hold a second type, particle size, or material of bulk material (B). The bulk material A may be the same as or different from the bulk material B. In FIG. 4, as the lower container 28a in a container stack 12 outputs the bulk material A into the blender receptacle 50, the bulk material B may be dispensed into the top of the lower container 28a via a gravity feed outlet such as a chute, duct, opening, or other transfer mechanism between the upper and lower containers 28. Once all the bulk material A is dispensed from the lower container 28a into the blender receptacle 50, the lower container 28a may be completely filled with the bulk material B received from the upper container 28b. It may be desirable, in some instances, to arrange the containers 28 in a desired stacked order so that a desired bulk material is provided to the blender receptacle 50 at a certain time. Also, it may be desirable to arrange the container stacks 12 so that all the container stacks 12 are designed to output the same bulk material into the blender receptacle 50 at the same time.

In other embodiments, each container stack 12 may include one or more containers 28 holding the same type, particle size, and material of bulk material. Additionally, each container stack 12 may be used to supply a different type of bulk material to the blender receptacle 50. For example, the stack 12 in FIG. 4 having just one container 28 may be used to provide a first type of bulk material that is different from a second type of bulk material supplied by one or more of the two-container stacks 12. The three two-container stacks 12 in FIG. 4 may all be used to provide a second type of material that is needed in larger quantities to the blender receptacle 50. It should be noted that other arrangements of different materials within the container stacks 12 may be utilized in other embodiments. For example, in the embodiments of FIGS. 2 and 5, each of the container stacks 12 may be used to provide a different type of bulk material to the blender receptacle 50.

In the embodiments of FIGS. 2-5, each container stack 12 includes one stackable container 28 or two containers 28 stacked one over the other. However, it should be noted that other embodiments of the system 10 may utilize three or more containers 28 disposed in a stacked arrangement to form container stacks 12 for supplying bulk material into the blender receptacle 50. In embodiments with a large number of containers 28 in each stack, the containers 28 may need to be lifted higher via a hoisting mechanism (e.g., crane or forklift). Container stacks 12 that have a larger number of containers 28 disposed therein, however, may provide a relatively high bulk material capacity, allowing more time for replacing the containers 28 as needed while performing the well treatment. Similarly, a greater number of container stacks 12 may be positioned around the blender receptacle 50 to increase the capacity of the bulk material transfer system 10.

Figure 6:
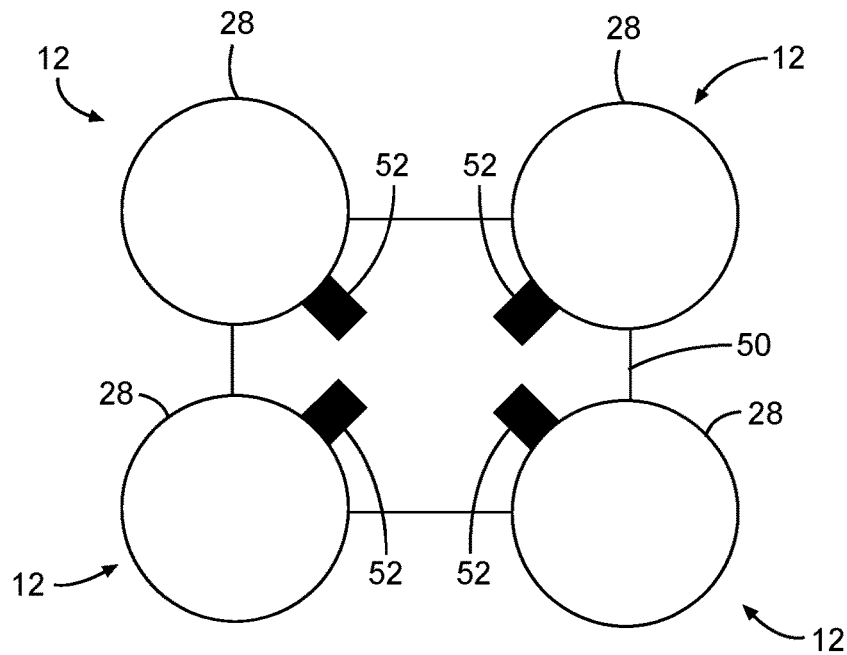
FIG. 6 is a schematic top view of the containers around the blender receptacle of FIG. 4, in accordance with an embodiment of the present disclosure.

A top view of the arrangement of containers stacks 12 of FIG. 4 is illustrated in FIG. 6. As shown, the containers 28 may be positioned around different sides of the blender receptacle 50. As noted above, the gravity feed outlets 52 may extend downward from the lowest containers 28a in the container stacks 12 to direct bulk material freely from the container stacks 12 into the blender receptacle 50 as desired.

Figure 7:
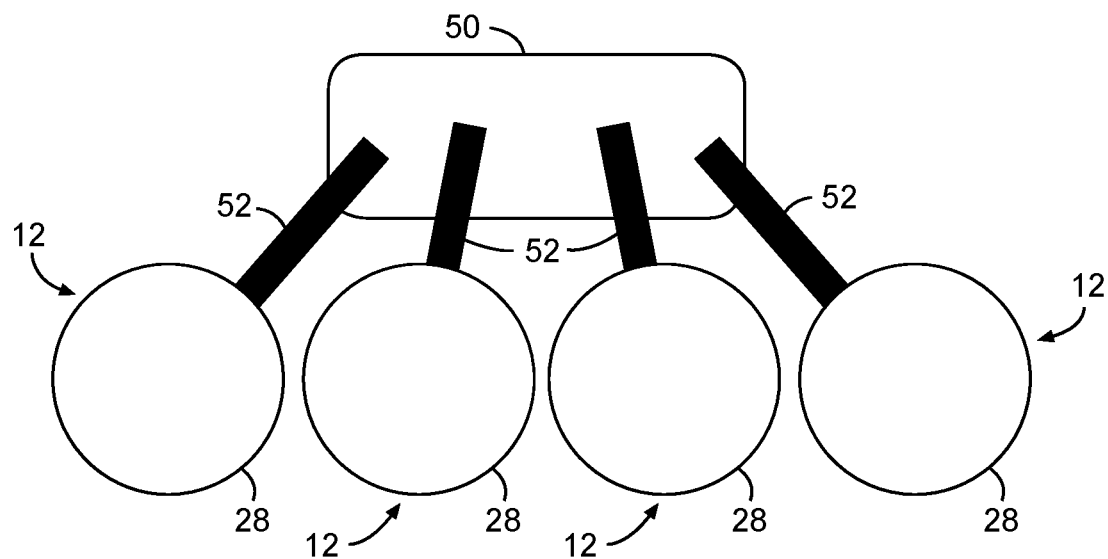
FIG. 7 is a schematic top view of containers holding bulk material arranged linearly along one side of a blender receptacle, in accordance with an embodiment of the present disclosure.

Another arrangement of containers stacks 12 is illustrated in FIG. 7. In this embodiment, the container stacks 12 may be arranged linearly along a single side of the blender receptacle 50. Any other desirable arrangement of the container stacks 12 may be implemented at a given well site. For example, the containers stacks 12 may be positioned around 2 or 3 sides of the blender receptacle 50.

Arranging the container stacks 12 on just one side of the blender receptacle 50 may enable a more efficient use of space at the well site. This arrangement may also enable transportation units (e.g., trucks) to more efficiently maneuver through the well site, as they only need to park on a single side of the blender receptacle 50 to provide new containers 28 to the container stacks 12 and/or to receive empty containers that are being removed from the stacks 12.

Figure 8A:
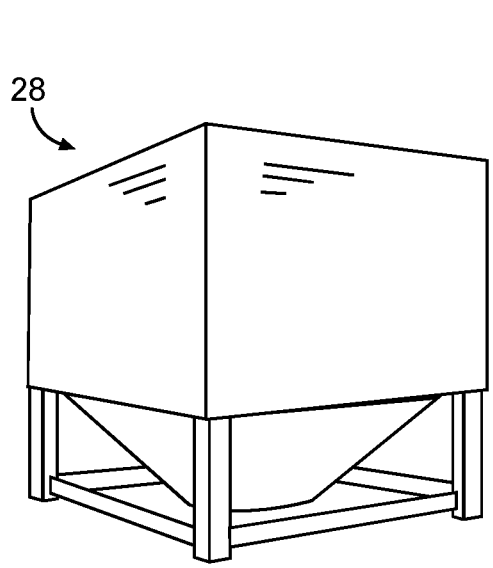
FIGS. 8A and 8B are perspective views of containers that may be arranged in stacks around the blender receptacle of FIGS. 2-7, in accordance with an embodiment of the present disclosure.
Figure 8B:
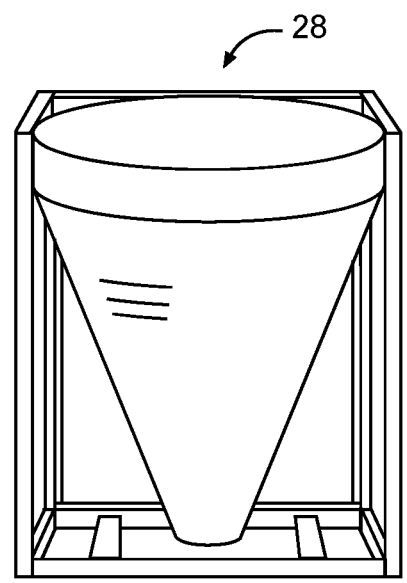

The containers 28 used in the container stacks 12 described above may be any desirable shape. For example, the containers 28 may be squared (as shown in FIG. 8A), rounded (as shown in FIG. 8B), cylindrical, oblong, oval, slightly bowed, or any other desirable shape. The containers 28 may be a "dump" type of container with one or more hatches at the bottom designed to automatically open in a manner that dumps the bulk material out of the container 28. The "dump" type of containers 28 may also include one or more operable gates on the bottom of the containers 28 designed to be opened/closed to dump the bulk material.

In some embodiments, the containers 28 may include one or more Super Sack® containers. When using these types of containers 28, the automatic dumping may be achieved by moving the sack across a sharp blade. Once the bulk material is transferred therefrom, the empty sacks may be removed and deposited in a trash bin. In other embodiments, the containers 28 may include one or more reusable sacks with a relatively stronger construction that enables the sacks to be refilled off location. That way, the sacks can later be returned to and re-used as containers 28 in the container stacks 12. These reusable sacks may be constructed as larger than existing Super Sacks and designed so they can be filled from the top and emptied out of the bottom.

In some embodiments, the containers 28 may be partially or fully enclosed to guard the bulk material against the elements (e.g., sun, rain, and other weather). The containers 28 may be equipped with additional side walls disposed around the internal volume of the containers 28, for aesthetic reasons as well as to enable easier cleanup after the container 28 is emptied and removed from the stack 12. That is, any dust generated from within the internal volume of the container 28 may be contained within the additional side walls and enclosed portions and then subsequently removed or filtered, to prevent undesirable dust accumulation outside the container 28. In some embodiments, the containers 28 may be constructed with one or more coupling mechanisms (e.g., hooks, latches, slots) to enable engagement between the container 28 and a hoisting mechanism (e.g., crane, forklift, etc.) used to raise or lower the container 28.

Bulk material inventory tracking may be generally desired at the well site. As shown in FIG. 4, such bulk material inventory tracking may be accomplished through a number of different sensors 70 disposed about the well site. These sensors 70 may be communicatively coupled to one or more controllers 72 (e.g., automated control system), which utilize at least a processor component 74 and a memory component 76 to monitor and/or control inventory at the well site. For example, one or more processor components 74 may be designed to execute instructions encoded into the one or more memory components 76. Upon executing these instructions, the processors 74 may provide passive logging of the amount, type, and location of certain bulk materials at the well site. In some embodiments, the one or more processors 74 may execute instructions for controlling the amount, type, and location of bulk materials that are being transported about the well site. For example, the processors 74 may output signals at a user interface 78 for instructing operators to remove an empty container 28 from a stack 12 and replace the container 28 with a new container 28 holding a certain type of bulk material needed for the well treatment. Other types of instructions for inventory control/monitoring may be provided through the disclosed systems.

As noted above, the inventory control system 72 may include a number of different sensors 70. In some embodiments, these sensors 70 may include one or more load cells or bin full switches for tracking a level of bulk material in a container 28 and indicating whether a container 28 is empty, full, or partially full. Such sensors 70 may be used for any given container 28, the blender receptacle 50, a silo (not shown), or any other component at the well site. In addition, in some embodiments the sensors 70 may include RFID tags used to provide an indication of the particle size, bulk volume, weight, type, material, and/or supplier of the bulk material disposed in a certain container 28. In such instances, the controller 72 may be communicatively coupled to an RFID reader disposed in proximity to the containers 28 being moved about the well site.

In some embodiments, the containers 28 may include one or more electronic sensors 70 used to determine and indicate whether the container 28 is full or empty. As noted above, such electronic sensors 70 may be communicatively coupled (e.g., wirelessly) to an automated control system 72. The sensors 70 may instruct the system 10 or operators to proceed to the next available container when an "empty" or "nearly empty" signal is detected. In other embodiments, the containers 28 may be equipped with a mechanical sensor or mechanical indicator for indicating whether the container 28 is full or empty.

It may be particularly desirable for the upper (B) containers 28b of FIG. 4 to be equipped with sensors 70 for detecting whether the container 28 is full or empty. Once the upper container 28b is empty, an operator may receive an instruction from the automated control system 72 to remove and replace the empty container 28 with a new, full container 28. Thus, the lower container(s) 28a in the container stacks 12 may maintain a desired capacity of bulk material for supplying the blender receptacle 50 even while a hoisting mechanism is being used to remove and replace empty containers 28 from the stacks 12. This additional bulk material capacity may enable the well treatment operations to continue as desired while operators are reloading the container stacks 12. By swapping only the upper containers 28b of the container stacks 12, the activity of hoisting mechanisms and other transportation systems may be reduced while maintaining the desired mixing and well treatment operations.

As described above, the disclosed system utilizes several relatively small, independent containers 28 to hold the bulk material needed for a well treatment, instead of a pneumatically filled silo. This arrangement of individual containers 28 may provide relatively easy methods for transporting the bulk material around the well site. For example, the containers 28 may enable quick unloading of a transportation unit and quick loading/re-loading of the container stacks 12 using a forklift or other hoisting mechanism. This type of unloading/loading may be accomplished more efficiently than a pneumatic loading process. In addition, the containers 28 may be quickly pushed out of the way and removed from the container stacks 12 once emptied. The smaller volumes of bulk material provided in the containers 28 may enable a relatively rapid change of the type of bulk material delivered to the blender receptacle 50, allowing for quick customization of the well treatment. The multiple containers 28 (particularly when arranged in multiple stacks 12 feeding into the same blender receptacle 50) may provide a buffer for bulk material delivery so that the blender receptacle 50 is constantly being supplied with bulk material while transportation units are arriving and being unloaded at the well site. Furthermore, once the treatments are completed at the well site, any remainder of filled containers 28 may be easily hauled away or otherwise removed from location.

By making the bulk material unloading/loading process on location more efficient, the disclosed techniques may reduce the detention costs accrued at the well site, since transportation units may be able to unload their materials faster than would be possible using pneumatics. In addition, the disclosed techniques may enable the transfer of bulk material on location without generating excessive noise that would otherwise be produced through a pneumatic loading process. Still further, the bulk material remains in the individual containers 28 until it is output directly into the blender receptacle 50 via the container stack 12 and corresponding gravity feed outlet 52. Since the bulk material remains in the containers 28, instead of being released onto a conveyor, the container stacks 12 may enable movement of bulk material on location without generating a large amount of dust.

Although the present disclosure and its advantages have been described in detail, it should be understood that various changes, substitutions and alterations can be made herein without departing from the spirit and scope of the disclosure as defined by the following claims.

What is claimed is:

1. A method, comprising:
dispensing bulk material from a first container through a gravity feed outlet extending from the first container directly into a blender receptacle associated with a blender, wherein the first container is pre-filled and portable to enable elevated placement of the first container over the blender receptacle on a platform;
dispensing bulk material from a second container through a gravity feed outlet extending from the second container directly into the blender receptacle, wherein the second container is pre-filled and portable to enable elevated placement of the second container over the blender receptacle, and wherein the first container and the second container are disposed at different positions around the blender receptacle;
wherein dispensing bulk material from a first container comprises dispensing a first type of bulk material from the first container into the blender receptacle, and wherein dispensing bulk material from a second container comprises dispensing a second type of bulk material different from the first type from the second container into the blender receptacle.

2. The method of claim 1, further comprising dispensing bulk material from a first stack of multiple containers disposed in a stacked arrangement one over the other and comprising at least the first container directly into the blender receptacle.

3. The method of claim 2, further comprising dispensing bulk material from only a lowest container in the first stack directly into the blender receptacle.

4. The method of claim 2, further comprising dispensing bulk material from the each of the containers in the first stack through respective gravity feed outlets each extending directly into the blender receptacle, wherein there is no flow of bulk material between the containers in the first stack.

5. The method of claim 4, wherein dispensing bulk material from the each of the containers in the first stack comprises selectively routing bulk material from each container in the first stack into the blender receptacle.

6. The method of claim 2, further comprising dispensing bulk material from a second stack of multiple containers disposed in a stacked arrangement one over the other and comprising at least the second container, directly into the blender receptacle, wherein the first stack and the second stack are disposed at different positions with respect to the blender receptacle.

7. The method of claim 6, wherein the first stack and the second stack each comprise two or more containers stacked one over the other.

8. The method of claim 6, wherein the first stack and the second stack each supply a different type of bulk material to the blender receptacle.

9. The method of claim 8, further comprising:
dispensing bulk material from an upper container of the first stack into a lowest container of the first stack;
dispensing bulk material from only the lowest container of the first stack directly into the blender receptacle, wherein the upper container and the lowest container of the first stack comprise the same type of bulk material;
dispensing bulk material from an upper container of the second stack into a lowest container of the second stack;
dispensing bulk material only from the lowest container of the second stack directly into the blender receptacle, wherein the upper container and the lowest container of the second stack comprise the same bulk material.

10. The method of claim 6, wherein the first stack and the second stack are each disposed on different platforms disposed separately at different linear positions relative to the blender receptacle.

11. The method of claim 2, wherein a lower container of the first stack may hold a first type, particle size, or material of bulk material, while an upper container of the first stack may hold a second type, particle size, or material of bulk material.

12. The method of claim 1, further comprising selectively removing and replacing the first container when the first container is empty of bulk material.

13. The method of claim 1, further comprising mixing the bulk material dispensed into the blender receptacle with additives to generate a treatment fluid within the blender receptacle.

14. The method of claim 1, further comprising routing the bulk material from the blender receptacle to a mixer of the blender via a metering device.

15. The method of claim 1, wherein the platform is integral with the first container.

16. The method of claim 15, wherein the second container comprises a second integral platform.

17. The method of claim 1, further comprising:
measuring a volume of bulk material within the first container with one or more sensors configured to measure a weight or a fill level of the bulk material;
measuring a volume of bulk material within the second container with one or more sensors configured to measure a weight or a fill level of the bulk material; and
wherein the one or more sensors on the first container and the one or more sensors on the second container are communicatively coupled to one or more controllers, and wherein each of the one or more controllers comprise a processor and non-transitory memory.

18. The method of claim 17, further comprising:
replacing the first container or the second container in response to receiving an indication of empty or nearly empty from the sensor corresponding to the container.

19. The method of claim 18, further comprising:
logging the volume of the first container and the volume of the second container into an inventory control system executing on the one or more controllers.

20. The method of claim 19, further comprising:
replacing the first container or the second container in response to receiving an output signal from the inventory control system.

* * * * *